United States Patent
Hamanaka et al.

(10) Patent No.: US 9,853,527 B2
(45) Date of Patent: Dec. 26, 2017

(54) METHOD FOR PRODUCING A ROTOR

(71) Applicant: TOYOTA JIDOSHA KABUSHIKI KAISHA, Toyota-shi (JP)

(72) Inventors: Ippei Hamanaka, Toyota (JP); Yasuyuki Hirao, Okazaki (JP); Yasuo Kinoshita, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 195 days.

(21) Appl. No.: 14/820,962

(22) Filed: Aug. 7, 2015

(65) Prior Publication Data

US 2016/0126814 A1    May 5, 2016

(30) Foreign Application Priority Data

Nov. 5, 2014    (JP) .................. 2014-225339

(51) Int. Cl.
*H02K 15/02*    (2006.01)
*H02K 15/03*    (2006.01)
*H02K 1/27*    (2006.01)

(52) U.S. Cl.
CPC ........... *H02K 15/03* (2013.01); *H02K 1/2766* (2013.01); *Y10T 29/49012* (2015.01)

(58) Field of Classification Search
CPC    H02K 15/03; H02K 1/2766; Y10T 29/49012; Y10T 29/49009; Y10T 29/49002; Y10T 29/49
USPC ................ 29/598, 596, 592.1, 592
See application file for complete search history.

(56) References Cited

U.S. PATENT DOCUMENTS

2010/0123364 A1* 5/2010 Hsu .................. H02K 1/246
                                                                    310/180
2012/0200188 A1* 8/2012 Sano et al. ........... H02K 1/2766
                                                                    310/156.38

FOREIGN PATENT DOCUMENTS

| JP | 2009-201269 | 9/2009 |
| JP | 2010-193660 | 9/2010 |
| WO | WO 99/14839 A1 | 3/1999 |

\* cited by examiner

*Primary Examiner* — A. Dexter Tugbang
*Assistant Examiner* — Azm Parvez
(74) *Attorney, Agent, or Firm* — Oblon, McClelland, Maier & Neustadt, L.L.P.

(57) ABSTRACT

In a method for producing a rotor including a leak prevention hole formed in a rotor core to prevent leakage of magnetic flux from a permanent magnet; an outer-circumferential-side dovetail groove formed in an outer-circumferential-side inner wall of the leak prevention hole, an inner-circumferential-side dovetail groove formed, opposite the outer-circumferential-side dovetail groove, in an inner-circumferential-side inner wall of the leak prevention hole; and a non-magnetic bridge having both end portions engageable with the dovetail grooves, an external force is applied to bring the outer-circumferential-side inner wall close to the inner-circumferential-side inner wall, the non-magnetic bridge is inserted in the dovetail grooves while keeping the rotor core in an elastically deformed state, and, after inserting, the external force is released.

4 Claims, 6 Drawing Sheets

THE NUMBER OF ROTATIONS (×1000rpm)

METHOD FOR PRODUCING A ROTOR

CROSS-REFERENCE TO RELATED APPLICATIONS

This application is based upon and claims the benefit of priority from the prior Japanese Patent Application No. 2014-225339, filed Nov. 5, 2014, the entire contents of which are incorporated herein by reference.

BACKGROUND OF THE INVENTION

Field of the Invention

The present invention relates to a method for producing a rotor including a rotor core provided with a central hole and a hole for magnet (a magnet hole) formed in an outer circumferential portion, a permanent magnet mounted in the magnet hole, and a rotor shaft press-fitted in the central hole.

Related Art

Motors for hybrid vehicles and others are severely demanded for size reduction more than regular motors. Downsized motors tend to rise in temperature. Such a motor is more likely to cause a decrease in magnetic flux of a magnet at high temperature than in conventional motors. To prevent this decrease in magnetic flux density at high temperature, magnet material would be mixed with rare metal such as dysprosium. The rare metal is however expensive and hence leads to cost increase.

In order to reduce the amount of magnet material) and also decrease the amount of electric current to a stator to thereby reduce the amount of heat generation of a motor, it is an effective method to prevent leakage of magnetic flux in the rotor core and reduce consumption current of the motor. In Patent Document 1, accordingly, a rotor core is split into outer circumferential pieces in which magnetic flux will flow and an inner circumferential piece, which are coupled by non-magnetic bridges, to prevent the magnetic flux from leaking to the inner circumferential piece. Patent Document 2 also discloses that a bridge for reinforcing the strength of a magnet insertion hole is made of non-magnetic material to prevent magnetic flux leakage.

RELATED ART DOCUMENTS

Patent Documents

Patent Document 1: JP-A-2010-193660
Patent Document 2: JP-A-2009-201269

SUMMARY OF THE INVENTION

Problems to be Solved by the Invention

However, the conventional rotors would cause the following problems. In Patent Document 1, specifically, the rotor core is formed of the separate outer and inner circumferential pieces, which are fixed to each other with the non-magnetic bridges. Thus, since variations in assembly accuracy reflect in an outer diameter of the rotor core, this would cause a problem with difficulty in reducing a gap or clearance between a stator and a rotor. To reduce the amount of current to be supplied to the stator, the clearance between the stator and the rotor should be reduced, but such a reduction would be irrealizable.

Further, if the outer diameter of the rotor changes, not only the risk of interference with the stator, but also motor torque and motor loss vary disadvantageously.

In Patent Document 2, the non-magnetic bridges couple an outer circumferential portion located more outside than the magnet insertion holes to an inner circumferential portion located more inside than the magnet insertion holes to prevent the outer circumferential portion from expanding outward by a centrifugal force. For this purpose, both end portions of each non-magnetic bridge are press-fitted in dovetail grooves of the outer and inner circumferential portions. In this press-fitting process, the non-magnetic bridge would rub against the inner wall surfaces of the dovetail grooves, which may cause generation of fine or minute friction dust. Such friction dust may enter various places in the motor when mounted and driven in a hybrid vehicle, resulting in damage thereto.

In a case where a non-magnetic bridge is inserted with a clearance into a pair of dovetail grooves, the outer circumferential portion of the rotor core may be deformed by a centrifugal force. The clearance between the outer periphery of a rotor and a stator is originally small in order to reduce the amount of current to be supplied to the stator. Thus, if the outer circumferential portion of the rotor core is even slightly deformed, the clearance between the rotor and the stator is relatively greatly changed, which may affect the rotation of the rotor.

The present invention has been made to solve the above problems and has a purpose to provide a method for producing a rotor, including a step of mounting both end portions of a non-magnetic bridge in a pair of dovetail grooves without producing fine friction dust due to rubbing.

Means of Solving the Problems

To achieve the above purpose, one aspect of the invention provides a method for producing a rotor including a rotor core provided with a central hole and a magnet hole formed in an outer circumferential portion, a permanent magnet mounted in the magnet hole, and a rotor shaft press-fit in the central hole, wherein the rotor includes: a magnetic flux leakage prevention hole formed in the rotor core to prevent leakage of magnetic flux from the permanent magnet; an outer-circumferential-side dovetail groove formed in an outer-circumferential-side inner wall defining the magnetic flux leakage prevention hole on an outer circumferential side and an inner-circumferential-side dovetail groove formed, opposite the outer-circumferential-side dovetail groove, in an inner-circumferential-side inner wall defining the magnetic flux leakage prevention hole on an inner circumferential side; and a non-magnetic bridge having both end portions being wide-width portions individually engageable with the outer-circumferential-side dovetail groove and the inner-circumferential-side dovetail groove, and wherein the method includes: applying an external force to the rotor core to cause elastic deformation of the rotor core so that the outer-circumferential-side inner wall of the magnetic flux leakage prevention hole comes close to the inner-circumferential-side inner wall; inserting the both end portions of the non-magnetic bridge one in each of the outer-circumferential-side dovetail groove and the inner-circumferential-side dovetail groove while keeping the rotor core in an elastically deformed state; and releasing the external force after inserting the non-magnetic bridge.

According to the foregoing configuration, while the non-magnetic bridge is being inserted in the pair of dovetail grooves, there are clearances between the non-magnetic bridge and the inner wall of the outer-circumferential-side dovetail groove and between the non-magnetic bridge and the inner wall of the inner-circumferential-side dovetail groove. This can avoid generation of fine friction dust. Since the leak magnetic flux can be reduced, furthermore, the amount of magnet material can be decreased, thus resulting in reduced cost of a motor.

Moreover, when the external force is released after insertion of the non-magnetic bridge in the pair of dovetail grooves, the non-magnetic bridge and the inner wall surfaces of the pair of dovetail grooves contact with each other at a constant force. This makes it possible to prevent the outer circumferential portion of the rotor core from getting deformed outward in a radial direction when the centrifugal force acts on the rotor, thereby enabling continuously keeping the clearance constant between the rotor and the stator. Thus, the rotation of the rotor is less likely to be affected.

DESCRIPTION OF EMBODIMENTS

Figure 1:
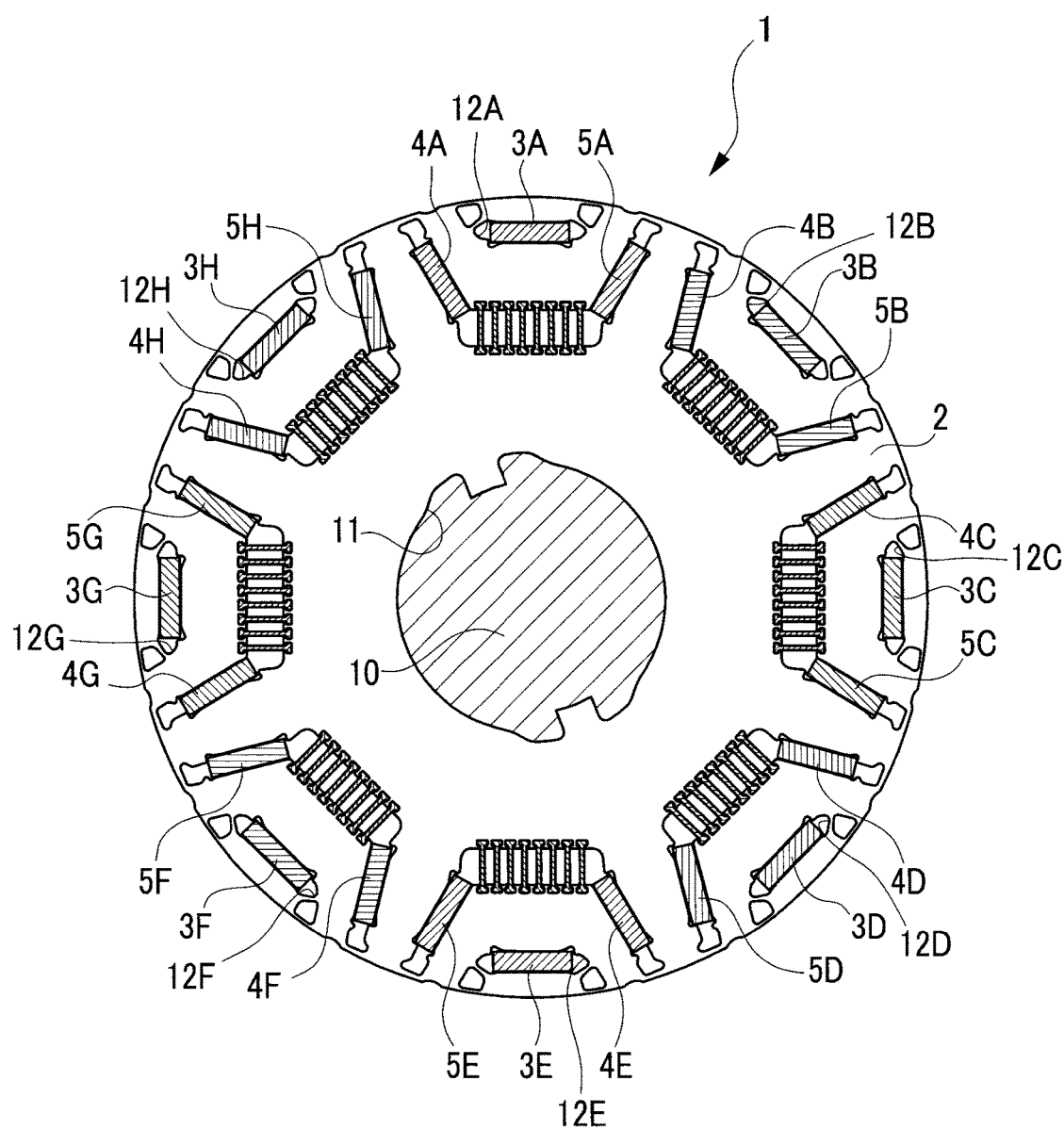
FIG. 1 is a configuration view of a rotor in an embodiment of the invention.
Figure 2:
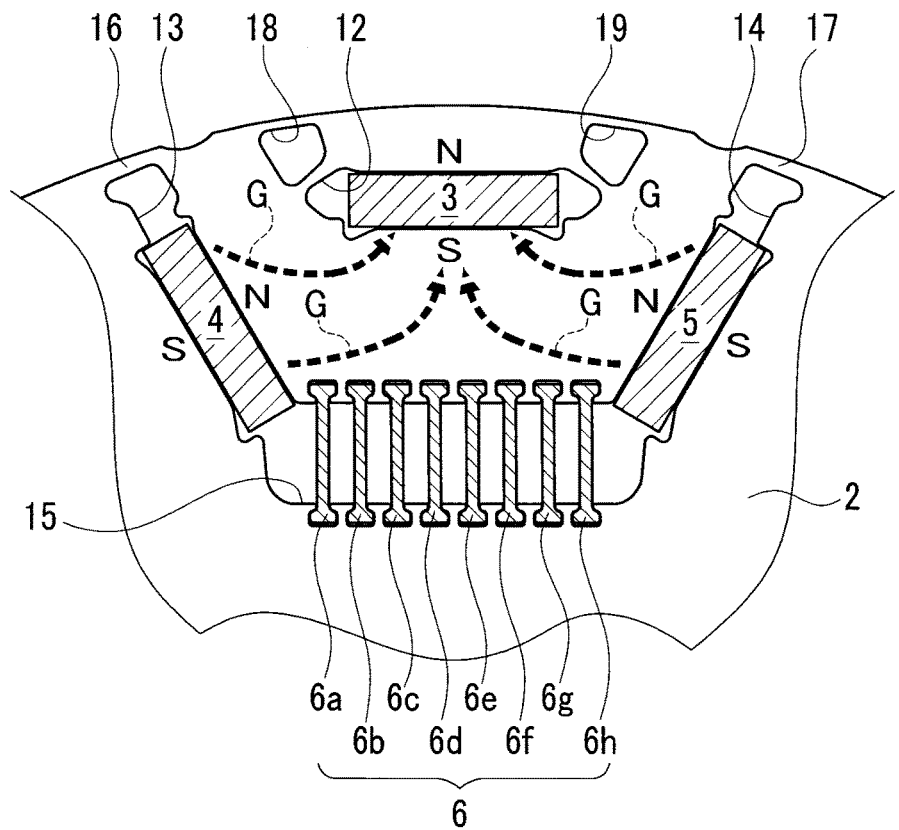
FIG. 2 is a partial enlarged view of FIG. 1.
Figure 3:
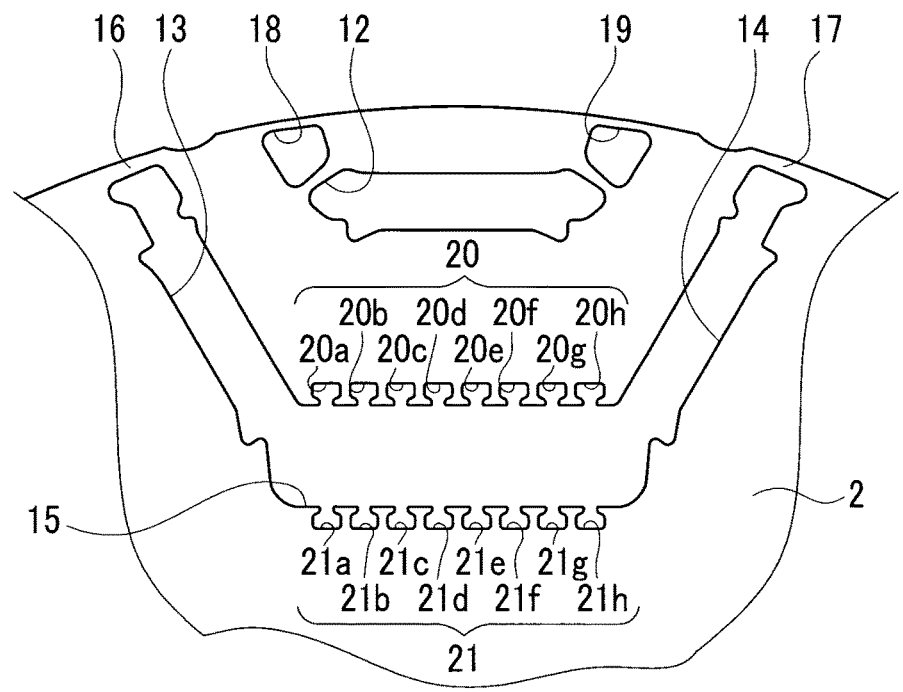
FIG. 3 is a view of the rotor of FIG. 2, in which a permanent magnet is unmounted.

A detailed description of a preferred embodiment of a method for producing a rotor core will now be given referring to the accompanying drawings. FIG. 1 is a configuration view of a rotor 1. FIG. 2 is a partial enlarged view of the rotor 1. FIG. 3 is a view of the rotor 1 of FIG. 2, in which permanent magnets 3, 4, and 5 and non-magnetic bridges 6 are unmounted.

A rotor core 2 is made of stacked or laminated several hundred thin plates produced by way of punching a magnetic steel plate having a thickness 0.1 to 0.3 mm by a press. Each thin plate is formed with a plurality of dowels in half-cut shape not shown so that the thin plates are stacked one on another with a projection of each dowel being fitted in a recess of each adjacent dowel. Accordingly, first magnet holes 12, second magnet holes 13, third magnet holes 14, and others are formed with respective inner wall surfaces accurately aligned.

In a central hole 11 of the rotor core 2, a rotor shaft 10 is fitted. In an outer circumferential portion of the rotor core 2, there are formed the first magnet holes 12 (12A to 12H) in eight positions circumferentially spaced at equal angular intervals (45 degrees), serving as holes for holding circumferential-direction magnets. In those holes 12, the permanent magnets 3 (3A to 3H) are individually mounted. Magnetic poles of each permanent magnet 3 are defined, for example, so that the north pole is located on an outer circumferential side and the south pole is located on an inner circumferential side.

On both sides of each first magnet hole 12 in the circumferential direction of the rotor core 2, a pair of second magnet hole 13 and third magnet hole 14 serving as holes for holding radial-direction magnets are formed to extend in a radial direction (a nearly radial direction) of the rotor core 2. Furthermore, a core outer-circumferential connecting portion 16 is formed on a core outer circumferential side of each second magnet hole 13. A core outer-circumferential connecting portion 17 is formed on a core outer circumferential side of each third magnet hole 14.

In the second magnet holes 13, the permanent magnets 4 are individually mounted. The permanent magnets 4 are each oriented so that one surface close to the corresponding permanent magnet 3 is the north pole and an opposite surface is the south pole. In the third magnet holes 14, the permanent magnets 5 are individually mounted. The permanent magnets 5 are each oriented so that one surface close to the corresponding permanent magnet 3 is the north pole and an opposite surface is the south pole.

Between each pair of the second magnet holes 13 and the third magnet holes 14, there is formed a leak prevention hole 15 to prevent leakage of magnetic flux from the permanent magnets 3, 4, and 5. The second magnet hole 13 and the third magnet hole 14 are continuous as a hole through the leak prevention hole 15.

Further, a pair of leak prevention holes 18 and 19 are formed on both sides of each first magnet hole 12 in the circumferential direction of the rotor core 2 to prevent leakage of magnetic flux. This is to have the magnetic flux of the permanent magnet 3 concentrate between the leak prevention holes 18 and 19 and the outer periphery of the rotor core 32 when teeth of a stator come close to the permanent magnet 3.

An inner wall ("outer-circumferential-side inner wall") 15a of the leak prevention hole 15 on the outer circumferential side is formed with eight outer-circumferential-side dovetail grooves 20 (20a to 20h). An inner wall ("inner-circumferential-side inner wall") 15b of the leak prevention hole 15 on the inner circumferential side is formed with inner-circumferential-side dovetail grooves 21 (21a to 21h) opposite the outer-circumferential-side dovetail grooves 20a to 20h. In each opposite pair of the outer-circumferential-side dovetail grooves 20a to 20h and the inner-circumferential-side dovetail grooves 21a to 21h which are arranged respectively opposite to each other, one end portion 61 (61a to 61h) of the corresponding non-magnetic bridge 6 (6a to 6h) and the other end portion 62 (62a to 62h) (see FIG. 5) are inserted.

In FIG. 1, in each of the first magnet holes 12 (12A to 12H), the space not occupied with the permanent magnet 3 (3A to 3H) is filled with resin by molding. In each of the second magnet holes 13, the space not occupied with the permanent magnet 4 (4A to 4H) is filled with resin by molding. In each of the third magnet holes 14, similarly, the space not occupied with the permanent magnet 5 (5A to 5H) is filled with resin by molding.

Figure 5:
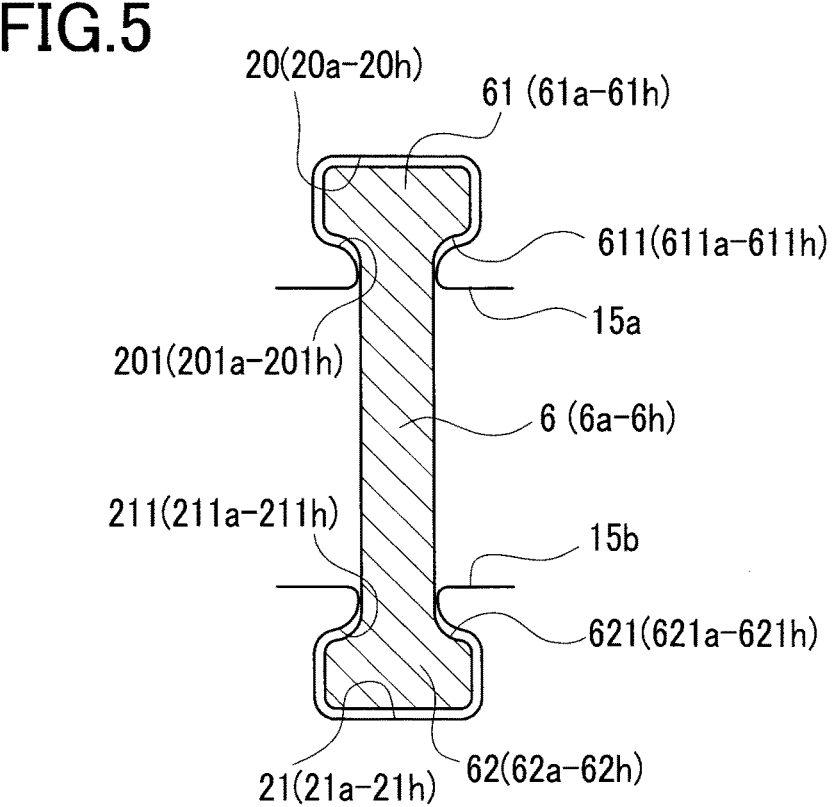
FIG. 5 is a partial enlarged view of FIG. 4, showing a state of inserting a non-magnetic bridge.

As shown in FIG. 5, each of the non-magnetic bridges 6 (6a to 6h) includes an end portion 61 (61a to 61h) which is an expanded, or wide-width, portion formed at one end in a length direction (an up-down direction in FIG. 5) and an end portion 62 (62a to 62h) which is an expanded, or wide-width, portion formed at the other end. Each end portion 61 is formed with a curved surface 611 (611a to 611h) on a side close to the opposite end portion 62. Each end portion 62 is formed with a curved surface 621 (621a to 621h) on a side close to the opposite end portion 61.

Each of the non-magnetic bridges 6 is an I-shaped member having a height equal to the thickness of the rotor core 2 in a direction perpendicular to the drawing sheet of FIG.

Figure 10:
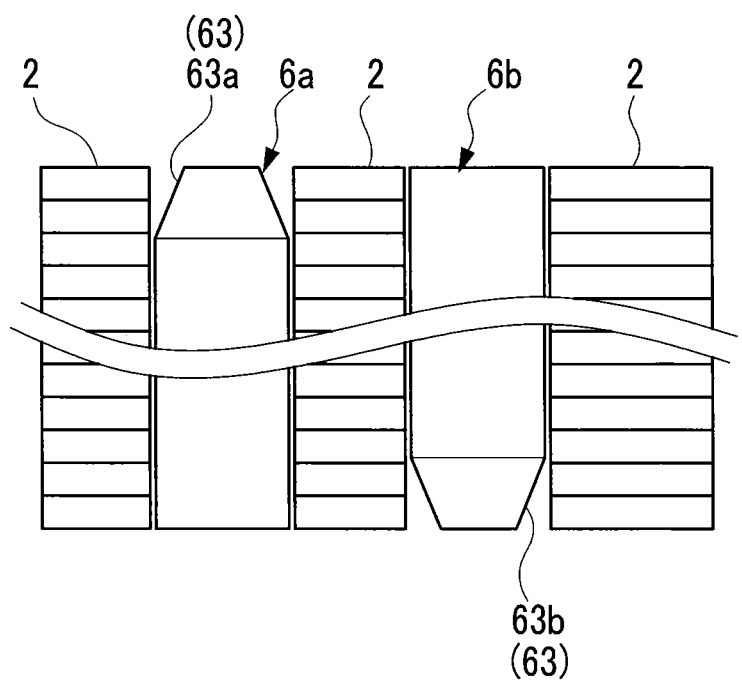
FIG. 10 is a view showing a chamfered state of non-magnetic bridges.

1 (i.e., in an axial direction of the rotor core 2), in which the cross sectional shape shown in FIG. 5 is continuous throughout the height. The end portions 61 and 62 of each I-shaped non-magnetic bridge 6 are each formed with a chamfer 63 (63a, 63b) over a whole circumference at one of both end faces in a height direction as shown in FIG. 10. This chamfer 63 is formed in only the one end face of each non-magnetic bridge 6, but it is not formed in the other end face.

Specifically, the non-magnetic bridge 6a is inserted upward from below into the rotor core 2 in FIG. 10, while the non-magnetic bridge 6b is inserted downward from above into the rotor core 2 so that respective one end faces formed with the chamfers 63 enter first into the rotor core 2. In the present embodiment, specifically, eight non-magnetic bridges 6a to 6h are inserted into the rotor core 2 so that the non-magnetic bridges 6a, 6c, 6e, and 6g are inserted upward from below, while the non-magnetic bridges 6b, 6d, 6f, and 6h are inserted downward from above.

In the present embodiment, the length of each chamfer 63 from the end face (i.e., the length in an up-down direction in FIG. 10) is 0.3 mm to 0.5 mm, which corresponds to the thickness of one or two layers of the stacked steel plates constituting the rotor core 2. Thus, the steel plate or plates located in a position corresponding to the chamfer 63 does not contact the non-magnetic bridge 6 and are in a free state. In the present embodiment, however, the non-magnetic bridges 6a to 6h are alternately inserted in opposite directions into the rotor core 2. Accordingly, even a steel plate located at the end face of the rotor core 2 is pressed and held by four non-magnetic bridges, so that the steel plate at the end face is suppressed from being deformed outward in a radial direction of the rotor core 2 by the centrifugal force. In the present embodiment, each non-magnetic bridge 6 is designed in one piece, but may be made of laminated non-magnetic steel plates.

Figure 8:
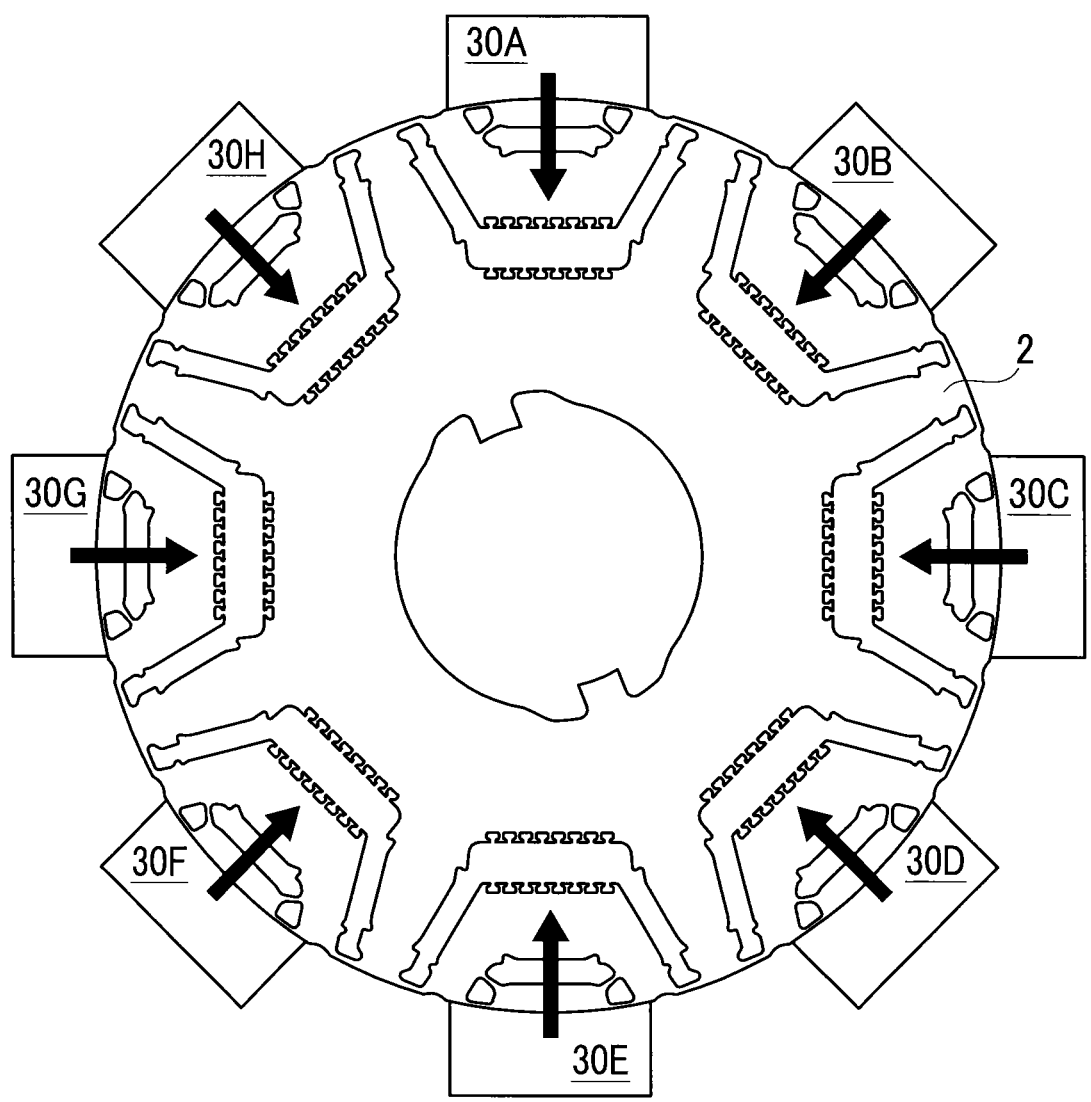
FIG. 8 is a view showing a step of pressing a rotor core.

Next, a method for inserting the non-magnetic bridges 6 will be explained, referring to the accompanying drawings. FIG. 8 shows a state of the rotor core 2 in which the permanent magnets 3, 4, and 5 and the non-magnetic bridges 6 are not yet mounted. In this state, eight compression units 30A to 30H are each moved inward in the radial direction of the rotor core 2 to press and compress the rotor core 2 at a predetermined pressing force F in eight places. A part thereof is shown in an enlarged view of FIG. 4. In the present embodiment, the rotor core 2 is pressed in to a compressed state simultaneously in eight places. As an alternative is to press the rotor core 2 into a compressed state in opposite places in a diametrical direction of the rotor core 2, for example, in only two places by the units 30A and 30E.

Figure 4:
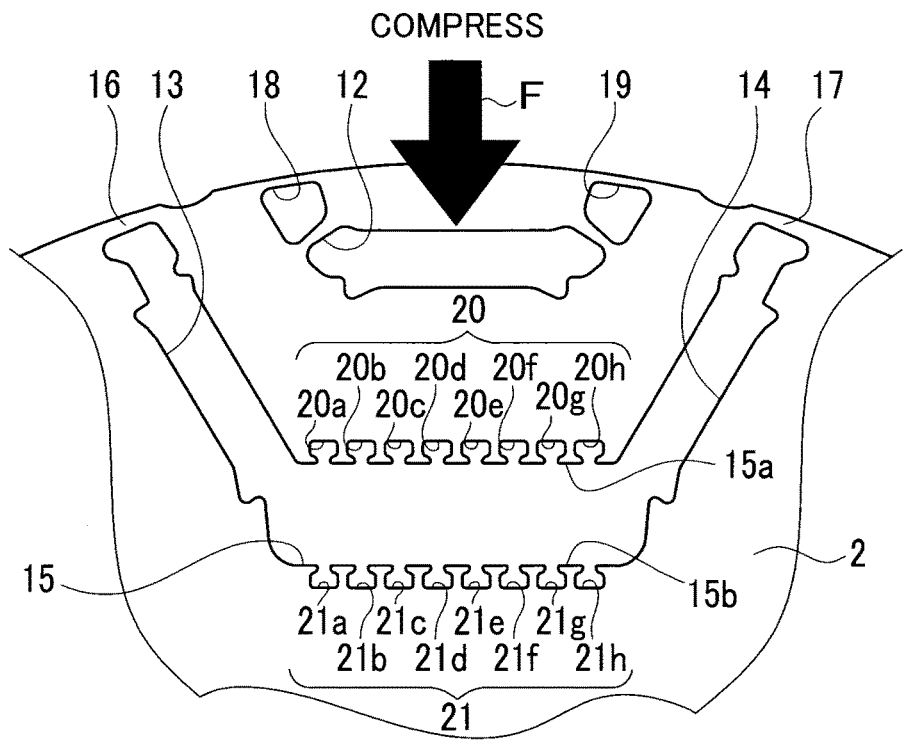
FIG. 4 is a view showing a state in which a pressing force is applied.

As shown in FIG. 4, the pressing force F is applied along a center line of the first magnet hole 12 of the rotor core 2. The first magnet hole 12, the second magnet hole 13, the third magnet hole 14, and the leak prevention hole 15 are configured line-symmetrical with respect to the center line of the first magnet hole 12. This allows the core outer-circumferential connecting portions 16 and 17 to be uniformly elastically deformed by the pressing force F. This causes the outer-circumferential-side inner wall 15a of the leak prevention hole 15 to come close to the inner-circumferential-side inner wall 15b while keeping their parallel relationship, so that the outer-circumferential-side dovetail grooves 20a to 20h also come close to the inner-circumferential-side dovetail grooves 21a to 21h respectively along each center line.

In this state, the eight non-magnetic bridges 6a to 6h are simultaneously inserted into the rotor core 2. In other words, the four non-magnetic bridges 6a, 6c, 6e, and 6g are inserted from back to front of the drawing sheet of FIG. 4, while the four non-magnetic bridges 6b, 6d, 6f, and 6h are inserted from front to back of the drawing sheet.

At that time, the end portions 61a to 61h of the non-magnetic bridges 6 are respectively inserted in the outer-circumferential-side dovetail grooves 20a to 20h of the rotor core 2 and simultaneously the end portions 62a to 62h are respectively inserted in the inner-circumferential-side dovetail grooves 21a to 21h. This inserting state (also an inserted state) of only one portion is shown in an enlarged view in FIG. 5.

As shown in FIG. 5, the pressing force F brings the outer-circumferential-side inner wall 15a of the leak prevention hole 15 close to the inner-circumferential-side inner wall 15b while keeping their parallel relationship. Thus, the curved surface 611 formed in the one end portion 61 of the non-magnetic bridge 6, on the side close to the other end portion 62, keeps a predetermined clearance with respect to a curved surface 201 (201a to 201h) formed near an opening of the outer-circumferential-side dovetail groove 20. Simultaneously, the curved surface 621 formed in the other end portion 62 of the non-magnetic bridge 6, on the side close to the one end portion 61, keeps a predetermined clearance with respect to a curved surface 211 (211a to 211h) formed near an opening of the outer-circumferential-side dovetail groove 21.

Since both the end portions 61 and 62 of each non-magnetic bridge 6 are inserted respectively in the outer-circumferential-side dovetail groove 20 and the inner-circumferential-side dovetail groove 21 while keeping the state of FIG. 5, the whole outer periphery of the end portion 61 remains spaced with the predetermined clearance from the inner wall surface of the outer-circumferential-side dovetail groove 20 and simultaneously the whole outer periphery of the end portion 62 remains spaced with the predetermined clearance from the inner wall surface of the inner-circumferential-side dovetail groove 21. Thus, any fine friction dust will not be generated.

Figure 6:
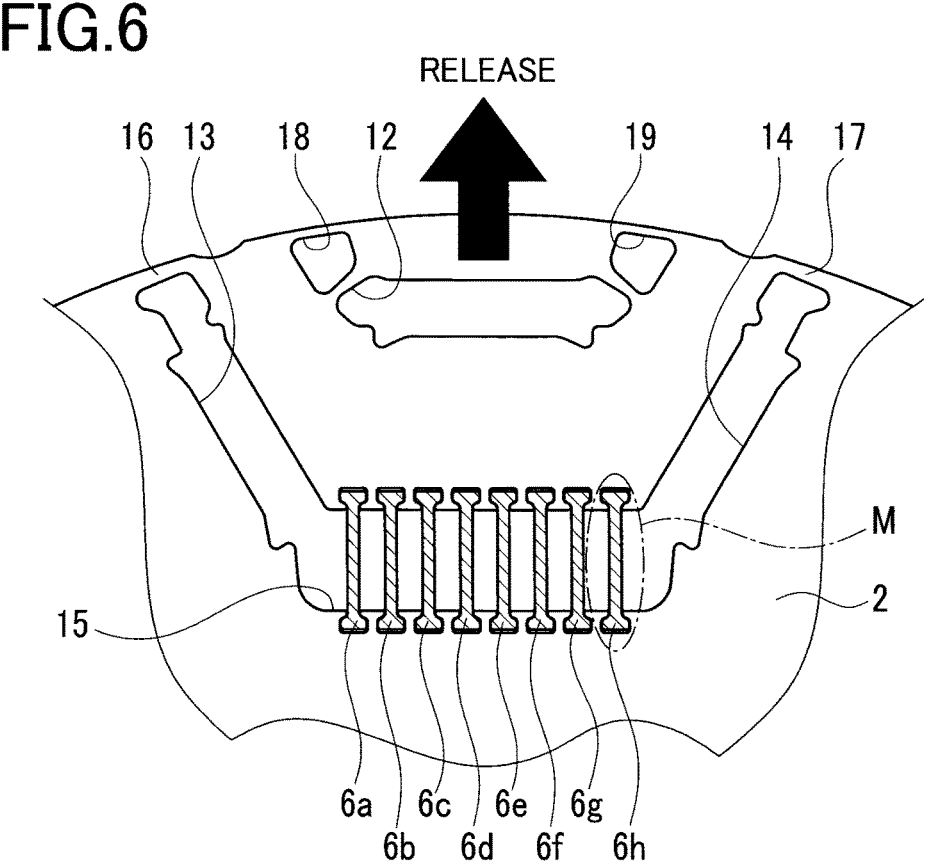
FIG. 6 is a view showing a state in which the pressing force is released.
Figure 7:
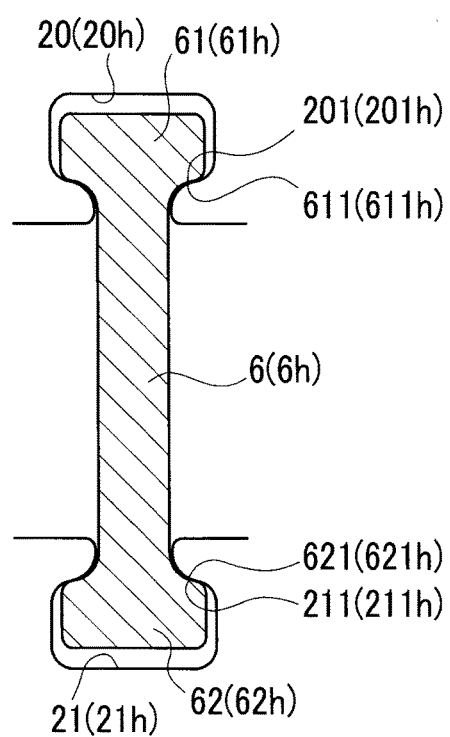
FIG. 7 is a partial enlarged view of FIG. 6.

Subsequently, as shown in FIG. 6, the pressing force F applied to the rotor core 2 is released. Specifically, after insertion of the non-magnetic bridges 6, the compression units 30A to 30H are moved outward in the radial direction of the rotor core 2, thereby releasing, or removing, the external force (the pressing force F) from the rotor core 2. Accordingly, the curved surfaces 611a to 611h of the end portions 61a to 61h of the non-magnetic bridges 6a to 6h and the curved surfaces 201a to 201h which are inner wall surfaces of the outer-circumferential-side dovetail grooves 20a to 20h are caused respectively to contact with each other at a constant force. Further, the curved surfaces 621a to 621h of the end portions 62a to 62h of the non-magnetic bridges 6a to 6h and the curved surfaces 211a to 211h which are inner wall surfaces of the inner-circumferential-side dovetail grooves 21a to 21h are caused respectively to contact with each other at a constant force. Of them, a part M in FIG. 6 is shown in an enlarged view in FIG. 7.

Accordingly, when the centrifugal force acts on the rotor 1, the outer circumferential portion of the rotor core 2 will not be deformed radially outward, so that the clearance between the rotor 1 and the stator can be kept continuously constant. The rotation of the rotor 1 is thus not affected.

On the other hand, it is conceivable to adopt clearance-fit for loose engagement in order to avoid the generation of fine friction dust caused by press-fit of the non-magnetic bridges 6. In this case, however, the following problems may come about.

Figure 9:
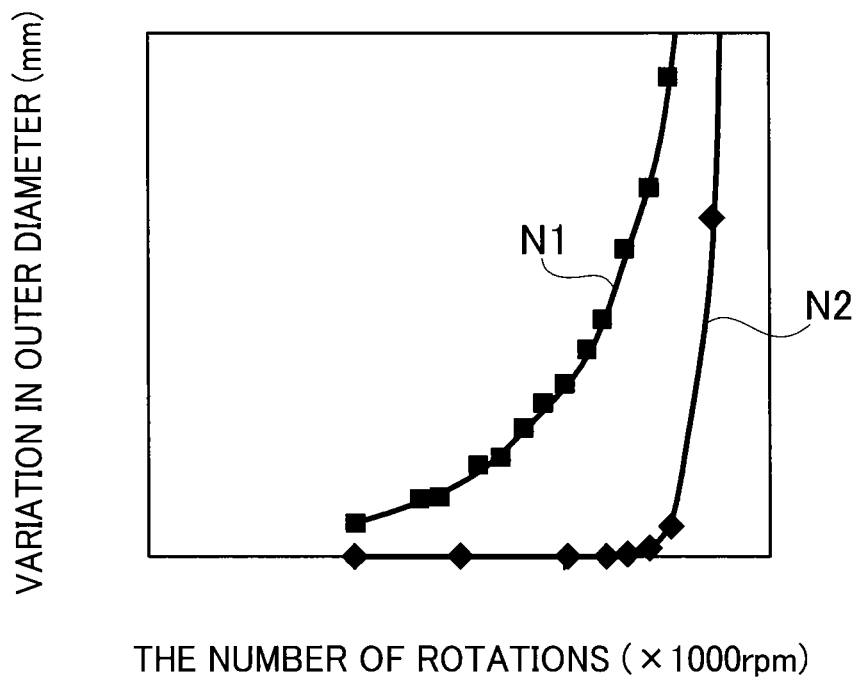
FIG. 9 is a graph showing data on variation in outer diameter.

FIG. 9 is a graph showing a relationship between the number of motor rotations and the variation in outer diameter of the rotor core 2. The outer diameter of the rotor core 2 in the present embodiment is 200 mm to 300 mm. A lateral axis of the graph represents the number of rotations of a motor (a rotor), which is expressed in units of 1000 rpm. A vertical axis of the graph represents the variation in outer diameter of the rotor core 2 in units of mm.

In FIG. 9, N1 indicates a result of a rotor core realized by the clearance-fit, in which there are large or small variations in clearance between the both end portions of each non-magnetic bridge and the corresponding dovetail groove inner walls. N2 indicates a result of the rotor core 2 in the present embodiment. In the rotor core 2, all the curved surfaces 611 and 621 of the both end portions 61 and 62 of the non-magnetic bridges 6 are in continuously contact with the curved surfaces 201 and 211 of the dovetail grooves 20 and 21.

When the number of rotor rotations reaches a value half of the regular number of rotations, N1 indicates variations in the outer diameter changing in the order of 0.01 mm, whereas N2 indicates almost no variation, or nearly zero. This reveals that the outer diameter of the rotor core 2 in the present embodiment hardly changes even if the number of rotor rotations increases.

In FIG. 2, magnetic flux flows G of the permanent magnets 4 and 5 are indicated with arrows. The magnetic flux flows G are considered to also pass nearby the end portions 61a to 61h of the corresponding non-magnetic bridge 6.

In a case where a single non-magnetic bridge 6 is provided for each leak prevention hole 15, the end portion 61 could be formed as a wide-width portion having a large size (cross sectional area) from necessity for strength. Such a large end portion may block or interfere with the magnetic flux flows G and cause deterioration in magnetic flux density. The present embodiment employs eight non-magnetic bridges 6a to 6h for sharing the burden of required strength, so that respective end portions 61a to 61h have a smaller size (cross sectional area) than in the case of the single non-magnetic bridge 6, thereby ensuring a large cross section of the region of the rotor core 2 through which magnetic fluxes will pass, thus leading to less interference with the magnetic flux flows G.

(1) According to the rotor producing method of the present embodiment, as described in detail above, in the method for producing the rotor 1 including the rotor core 2 provided with the central hole 11 and the first to third magnet holes 12 to 14 formed in the outer circumferential portion, the permanent magnets 3 to 5 respectively mounted in the first to third magnet holes 12 to 14, and the rotor shaft 10 press-fitted in the central hole 11, the rotor 1 includes the leak prevention holes 15 formed in the rotor core 2 to prevent leakage of magnetic flux from the permanent magnets 3 to 5, the outer-circumferential-side dovetail grooves 20 formed in the inner wall 15a of each leak prevention hole 15, the inner-circumferential-side dovetail grooves 21 formed, opposite the outer-circumferential-side dovetail grooves 20, in the inner-circumferential-side inner wall 15b of each leak prevention hole 15, and the non-magnetic bridges 6 each having the both end portions 61 and 62 respectively engageable with the outer-circumferential-side dovetail grooves 20 and the inner-circumferential-side dovetail grooves 21. The method includes applying the external force (the pressing force F) to the rotor core 2 to cause elastic deformation of the rotor core 2 so that the outer-circumferential-side inner walls 15a of the leak prevention holes 15 come close to the corresponding inner-circumferential-side inner walls 15b, inserting the both end portions 61 and 62 of the non-magnetic bridges 6 respectively in the outer-circumferential-side dovetail grooves 20 and the inner-circumferential-side dovetail grooves 21 while keeping the rotor core 2 in an elastically deformed state, and, after inserting, then releasing the external force from the rotor core 2. Accordingly, when the non-magnetic bridges 6 are being inserted in the corresponding pairs of the dovetail grooves 20 and 21, there are clearances between each non-magnetic bridge 6 and each inner wall surface of the outer-circumferential-side dovetail grooves 20 and the inner-circumferential-side dovetail grooves 21. This can avoid generation of fine friction dust. Since the leak magnetic flux can be reduced, furthermore, the amount of magnet material can be reduced, thus resulting in reduced cost of a motor.

When the external force is released after insertion of the non-magnetic bridges in the dovetail grooves 20 and 21, the non-magnetic bridges 6 and the inner wall surfaces of the corresponding pairs of the dovetail grooves 20 and 21 contact with each other at a constant force. This makes it possible to prevent the outer circumferential portion of the rotor core 2 from getting deformed radially outward when the centrifugal force acts on the rotor 1, thereby enabling continuously keeping the clearance constant between the rotor 1 and the stator. Thus, the rotation of the rotor 1 is less likely to be affected.

(2) In the rotor producing method described in (1), the holes for magnets (the magnet holes) include the first magnet holes 12 formed to extend in a circumferential direction of the rotor core 2, the second magnet holes 13 and the third magnet holes 14 formed on both sides of each magnet hole 12 in the circumferential direction, each of the holes 13 and 14 extending in the radial direction of the rotor core 2. The rotor core 2 is formed with the core outer-circumferential connecting portions 16 and 17 on the core outer circumferential sides of the second magnet holes 13 and the third magnet holes 14. The elastic deformation is caused in the core outer-circumferential connecting portions 16 and 17. Specifically, when the external force is applied to the rotor core 2, the pair of core outer-circumferential connecting portions 16 and 17 are elastically deformed. This elastic deformation can thus be sufficiently obtained by a relatively small force. Also, the core outer-circumferential connecting portions 16 and 17 are deformed so that the outer-circumferential-side inner wall 15a of each leak prevention hole 15 is kept in parallel to the inner-circumferential-side inner wall 15b. Consequently, even small elastic deformation allows the clearance to be uniformly created between the non-magnetic bridges 6 and the inner wall surfaces of the corresponding pairs of the dovetail grooves 20 and 21. In particular, in a case of using a plurality of the non-magnetic bridges 6, the clearance can be uniformly formed for each of the non-magnetic bridges 6a to 6h. This can facilitate insertion of the plurality of the non-magnetic bridges 6a to 6h without contacting with the inner wall surfaces of the dovetail grooves 20 and 21.

(3) In the rotor producing method described in (1) or (2), the non-magnetic bridges 6 include two or more non-magnetic bridges 6 each including the both end portions 61 and 62 each formed as the wide-width portion having a small size (cross sectional area) enough to ensure a large cross-sectional area of the rotor core 2 through which magnetic flux of the permanent magnets 3, 4, and 5 will pass. Thus, the end portions 61 and 62 of each non-magnetic bridge 6 can be reduced in size as compared with the conventional case. Accordingly, when each leak prevention hole 15 is formed with the necessary area, the cross-sectional area of the end portions 61 and 62 of each non-magnetic bridge 6 which may interfere with the cross-sectional area of the rotary core 2 through which the magnetic flux of the permanent magnets 3, 4, and 5 will pass can be reduced. Consequently, this can ensure a large cross sectional area through which the magnetic flux of the permanent magnets 3, 4, and 5 will pass.

The present invention may be embodied in other specific forms without departing from the essential characteristics thereof. For instance, the present embodiment uses eight non-magnetic bridges 6, but may use two, four, six, or ten non-magnetic bridges.

INDUSTRIAL APPLICABILITY

The present invention is utilizable as a method for producing a rotor for a motor to be used in a hybrid vehicle.

REFERENCE SIGNS LIST

1 Rotor
2 Rotor core
3, 4, 5 Permanent magnet
6 Non-magnetic bridge
10 Rotor shaft
12 First magnet hole
13 Second magnet hole
14 Third magnet hole
15 Leak prevention hole
16, 17 Core outer-circumferential connecting portion
20 Outer-circumferential-side dovetail groove
21 Inner-circumferential-side dovetail groove

What is claimed is:

1. A method for producing a rotor including a rotor core provided with a central hole and a magnet hole formed in an outer circumferential portion, a permanent magnet mounted in the magnet hole, and a rotor shaft press-fit in the central hole,
   wherein the rotor includes:
      a magnetic flux leakage prevention hole formed in the rotor core to prevent leakage of magnetic flux from the permanent magnet;
      an outer-circumferential-side dovetail groove formed in an outer-circumferential-side inner wall defining the magnetic flux leakage prevention hole on an outer circumferential side and an inner-circumferential-side dovetail groove formed, opposite the outer-circumferential-side dovetail groove, in an inner-circumferential-side inner wall defining the magnetic flux leakage prevention hole on an inner circumferential side; and
      a non-magnetic bridge having both end portions being wide-width portions individually engageable with the outer-circumferential-side dovetail groove and the inner-circumferential-side dovetail groove, and
   wherein the method includes:
      applying an external force to the rotor core to cause elastic deformation of the rotor core so that the outer-circumferential-side inner wall of the magnetic flux leakage prevention hole comes close to the inner-circumferential-side inner wall;
      inserting the both end portions of the non-magnetic bridge one in each of the outer-circumferential-side dovetail groove and the inner-circumferential-side dovetail groove while keeping the rotor core in an elastically deformed state; and
      releasing the external force after inserting the non-magnetic bridge.

2. The method for producing a rotor according to claim 1, wherein the magnet hole includes a circumferential-direction magnet hole formed to extend in a circumferential direction of the rotor core and a pair of radial-direction magnet holes formed on both side of the circumferential-direction magnet hole in the circumferential direction, each of the radial-direction magnet holes extending in a radial direction of the rotor core,
   wherein the rotor core includes a core outer-circumferential connecting portion on a core outer circumferential side of each of the pair of radial-direction magnet holes, and
   wherein the elastic deformation is caused in the core outer-circumferential connecting portions.

3. The method for producing a rotor according to claim 1, wherein the non-magnetic bridge includes two or more non-magnetic bridges each having both end portions each formed as a wide-width portion having a small size to ensure a large cross-sectional area of the rotor core through which the magnetic flux of the permanent magnet will pass.

4. The method for producing a rotor according to claim 2, wherein the non-magnetic bridge includes two or more non-magnetic bridges each having both end portions each formed as a wide-width portion having a small size to ensure a large cross-sectional area of the rotor core through which the magnetic flux of the permanent magnet will pass.

* * * * *